Oct. 11, 1960 R. H. McCULLOUGH 2,955,520
VIGNETTING FILM PRINTER
Filed Dec. 20, 1956 4 Sheets-Sheet 1
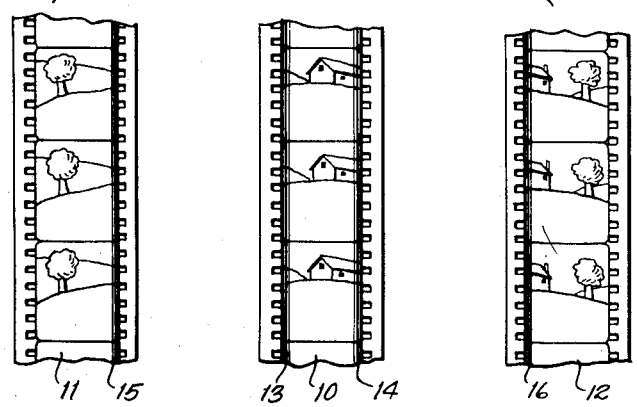
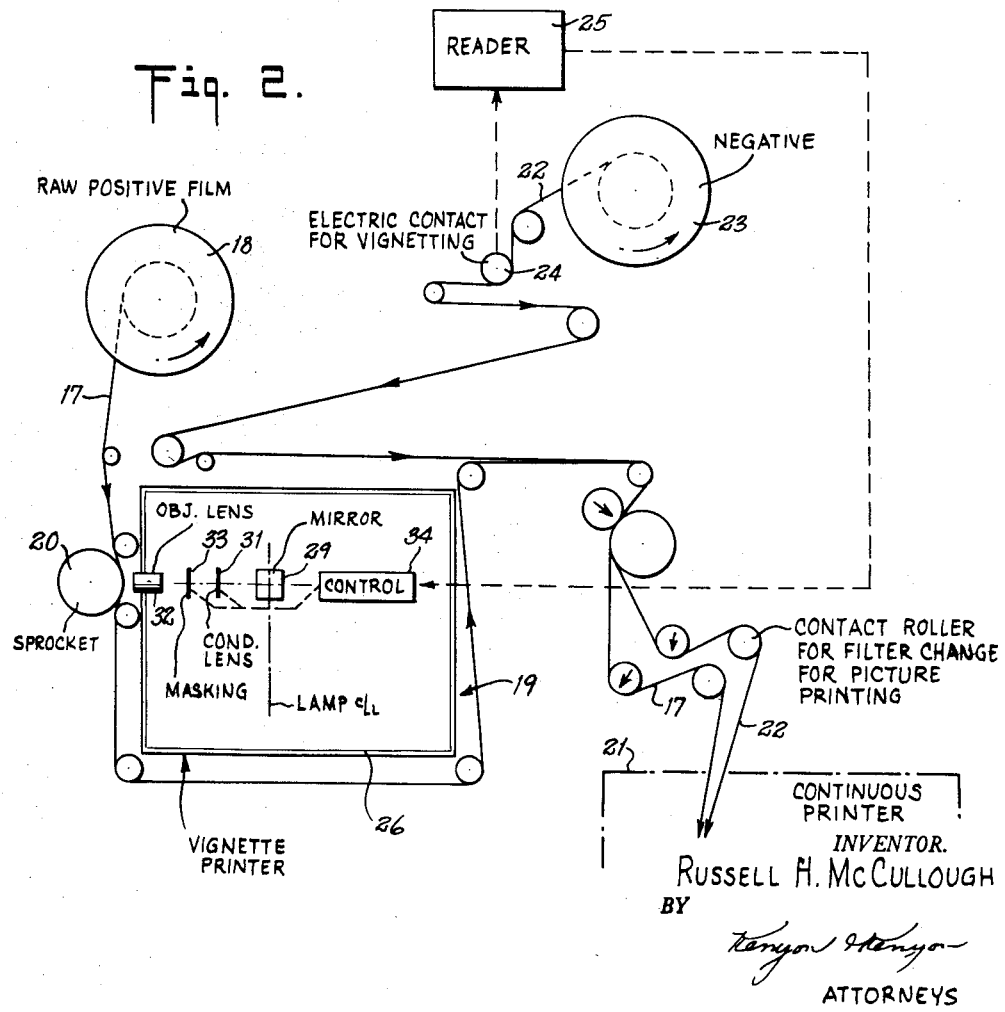
INVENTOR.
RUSSELL H. McCULLOUGH
BY
ATTORNEYS

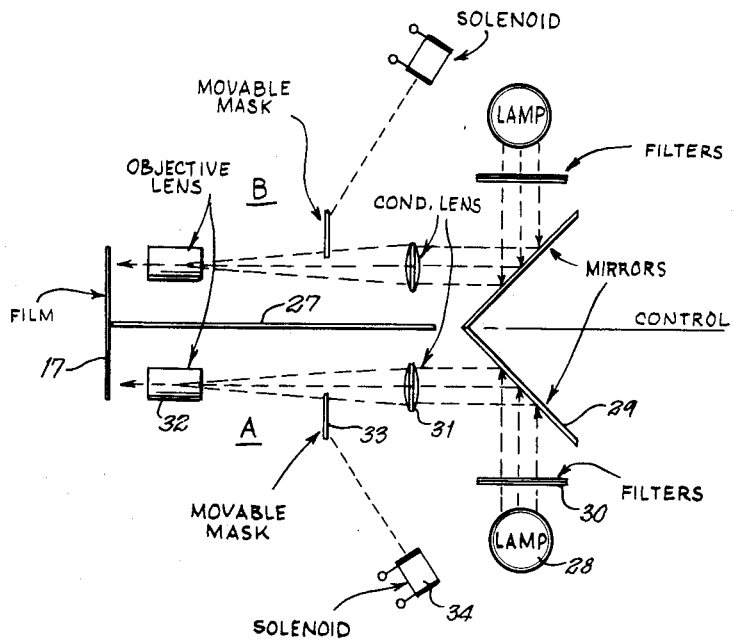
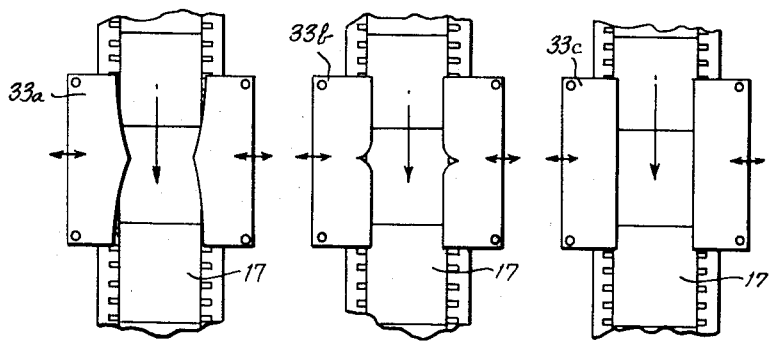

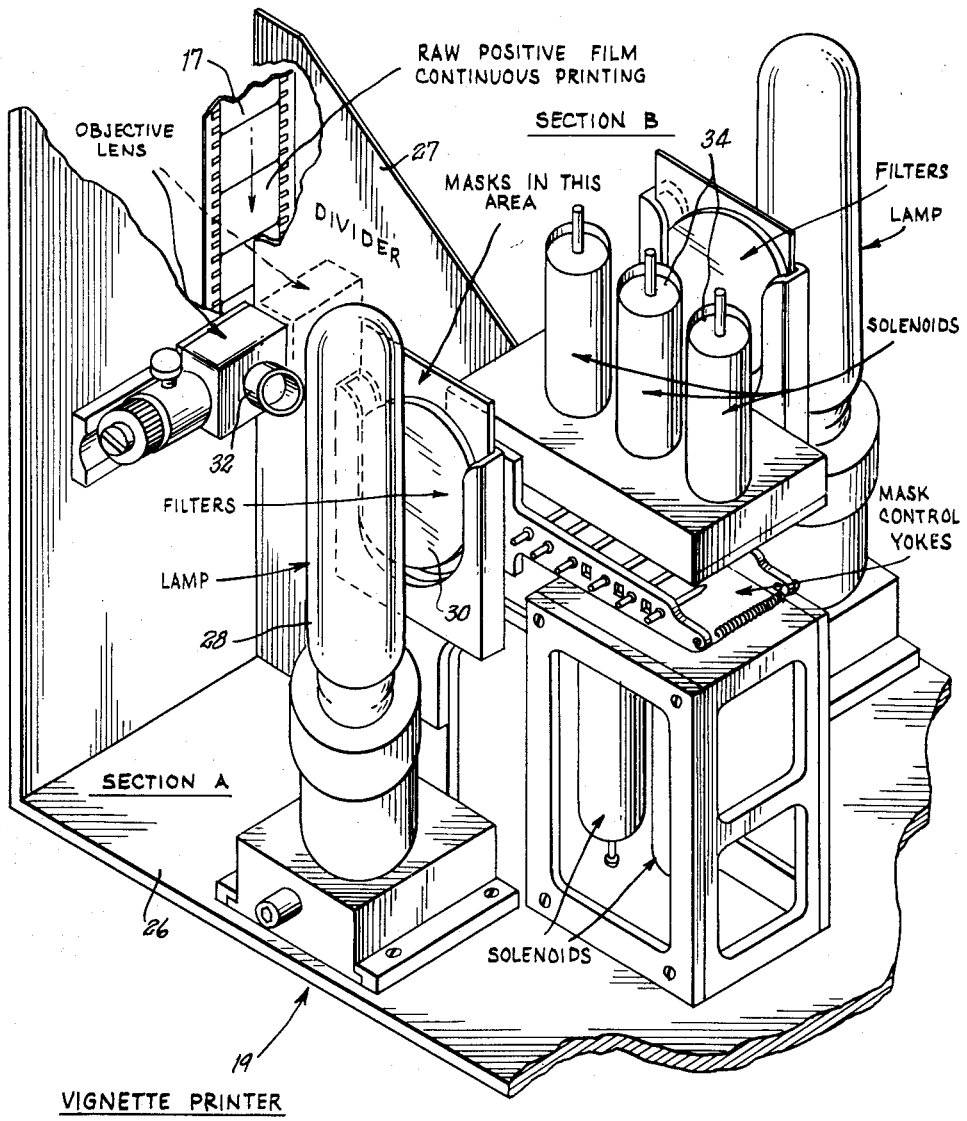

Oct. 11, 1960  R. H. McCULLOUGH  2,955,520
VIGNETTING FILM PRINTER

Filed Dec. 20, 1956  4 Sheets-Sheet 4

INVENTOR.
Russell H. McCullough
BY
Kenyon & Kenyon
ATTORNEYS

# United States Patent Office 2,955,520
Patented Oct. 11, 1960

2,955,520

VIGNETTING FILM PRINTER

Russell H. McCullough, Los Angeles, Calif., assignor to C-M Equipment Corporation, Los Angeles, Calif., a corporation of Delaware Filed Dec. 20, 1956, Ser. No. 629,742

9 Claims. (Cl. 95—75)

The present invention relates generally to motion picture vignetting techniques and more particularly to apparatus for printing vignetting stripes or bands directly on positive film. This application is a continuation-in-part of my copending application Serial No. 583,397, filed May 8, 1956.

In my copending application, Serial No. 583,397, filed May 8, 1956, there is disclosed a method and apparatus for photographically impressing vignetting stripes on positive film. The technique described and claimed in said copending application involves photographing a panoramic scene in mosaic sections to form a plurality of complementary negative films. Positive films are then made from the several negatives, and superimposed on the positive films at the adjacent frame margins thereof are vignetting stripes. The purpose of these stripes is to render the match lines of the separate image components virtually imperceptible when the films are projected and joined on a panoramic screen to form a mosaic picture.

Where the mosaic picture is constituted by three contiguous sections or panels, it is necessary that the center film be provided with vignetting stripes at either frame edge thereof, whereas the side films are each given a single stripe so positioned as to overlap the adjacent stripe in the center film in a manner effecting light compensation. The significant advantage of this technique is that it obviates the need for masks and other special vignetting mechanisms in the projector.

It is the main object of the present invention to provide an improved printing apparatus adapted photographically to impress vignetting stripes on raw positive film.

More particularly, it is an object of the invention to provide apparatus of the above described type constituted by a pair of masked light systems adapted to impress vignetting stripes at either edge of the positive film or only at one edge thereof.

Also an object of the invention is to provide a vignetting printing apparatus including a plurality of vignetting masks having different profile and selective control means to introduce a desired mask into its operative position in the printer.

A further object of the invention is to provide an automatic system responsive to contact marks placed on the negative film being printed and operating in conjunction with the selective mask control means on the vignette printer for the positive film so as to introduce a mask which is appropriate to the scene being printed.

Still another object of the invention is to provide a vignette printer of efficient mechanical and electrical design which is rapid and reliable in operation.

Briefly stated in a dual printing system in accordance with the invention for photographically impressing vignetting stripes as well as photographed images from a negative onto raw positive film, the system is constituted by a vignette printer adapted to impress at least one vignette band onto the positive film and including a plurality of masks of different profile. A control mechanism is provided selectively to actuate the masks so as to place them into operative position. Also provided is a continuous printer into which is fed the raw positive film containing said vignette stripes as well as a developed negative film. Contact elements are secured to the negative film at spaced points thereon to indicate different scene conditions, the elements engaging a sprocket wheel to produce signal impulses. A tape reader responsive to said signal impulses is coupled to said selective control mechanism in the vignette printer to shift appropriate masks into operative position therein; the reader having a punched tape on which is written the relevant instructions for the scene being photographed.

For a better understanding of the invention as well as other objects and further features thereof, reference is had to the following detailed description to be read in conjunction with the accompanying drawing, wherein like components in the various views are identified by like reference numerals.

In the drawings:

Fig. 1 shows the vignetting stripes as they appear on the multiple-projector positive films.

Fig. 2 is a schematic diagram of the dual printing system including a vignette printer and a continuous printer for impressing both picture images and vignetting stripes on the positive film.

Fig. 3 is a schematic diagram of the vignette printer.

Fig. 4 is a perspective view of the structure of the vignette printer.

Fig. 5 shows in front elevation one form of vignette mask for use in conjunction with the vignette printer.

Fig. 6 shows a second form of vignette mask.

Fig. 7 shows a third form of vignette mask.

Figure 8:
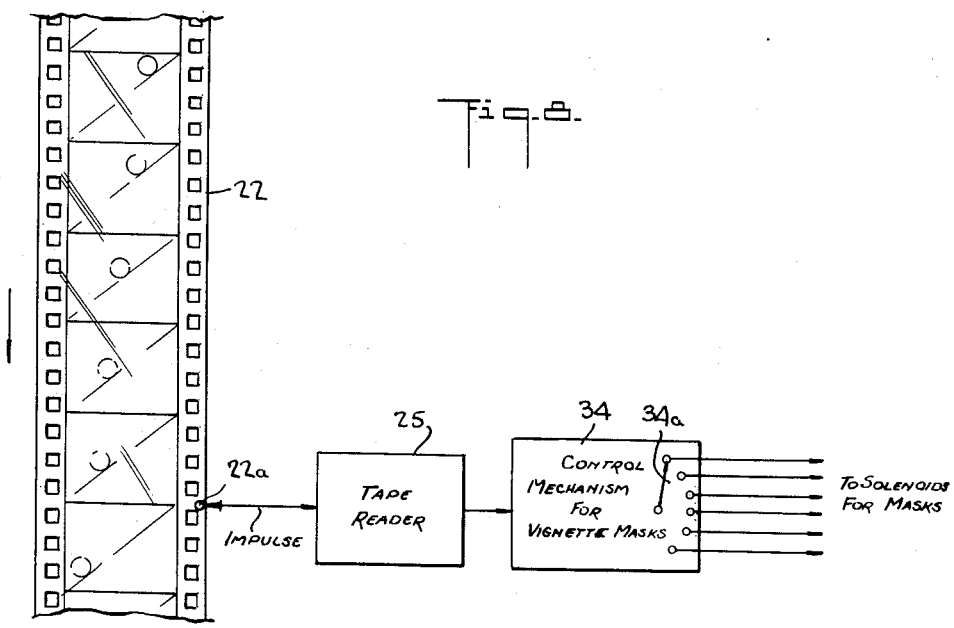
Fig. 8 is a schematic diagram showing the contact elements on the negative film for signalling changes of scene.

Before going into the structural details and the operation of the dual printing apparatus in accordance with the invention, it is desirable by way of background first to consider generally the nature of the films to be produced.

As shown in Fig. 1, the positive films to be projected on a panoramic screen are constituted by three webs 10, 11 and 12, each having the usual sprocket perforations running along the edges on either side of the picture frames. The panoramic scene which has been photographed by three separate cameras is divided equally among the three films. In addition to the picture image within the frame, the center film 10 has printed thereon vignetting stripes 13 and 14 which overlap the vertical margins of the picture frames. At the right edge of the frames in side film 11 is a vignetting stripe 15 and at the left edge of the frames in film 12 there is a vignetting stripe 16.

When the positive films are projected, the marginal edges of the frames are purposely overlapped on the screen, the stripes producing a gradation of illumination from full screen illumination at the white end to zero light transmission at the dark end. Since the overlapping stripes at the margins of adjacent films are in reverse relationship, the gradations in light intensity produced by one stripe is compensated for by the other. This results in a constant total of illumination which effectively erases the visible light striation otherwise produced at the match lines. Since the vignetting stripes are printed directly on the positive films, the need for vignetting devices in the projectors is eliminated.

It is to be understood that by vignetting stripes are meant not only the stripes formed of progressively spaced parallel lines but also bands of varying shade or light permeability serving to produce optical wedge effects.

Referring now to Fig. 2, there is shown schematically a printing arrangement for impressing vignetting stripes directly onto the positive film before the negative pictures are transferred thereto. Raw positive film stock 17 is drawn from a reel 18, the film web being carried over conventional rollers through a vignette printer, generally designated by numeral 19. This is accomplished by means of a sprocket wheel 20 which engages the sprocket holes in the film in the usual manner. The structure of the vignette printer will be described in greater detail in connection with Figs. 3 to 7. For the present it suffices to say that the printer 19 by means of a directed light beam acting in conjunction with suitable masks projects vignette bands onto the raw stock to produce bands thereon in the form shown in Fig. 1.

The raw positive film 17 then passes over suitable rollers into a continuous printer 21 of conventional design. Also fed into the continuous printer in superposed relation with the raw positive film is the exposed and developed negative film 22 drawn from a reel 23. In the continuous printer, the raw positive stock now carrying the vignette bands is again exposed, this time through the negative film, whereby the photographed images on the negative are printed thereon. In the case of the center film for the multiple projector system, the vignette stripes are applied by the vignette printer on either edge, and when the side films are passed through the vignette printer, only one stripe is placed thereon in the manner previously described. Thus each film is subjected to a double printing action, once in the vignette printer and again in the continuous printer.

The vignette printer is equipped with a number of vignetting masks of different shape or profile, each mask being intended for a scene of a particular type. Control means are provided for selectively placing the masks into operative position. The control apparatus may be in the form of a selective switch acting in conjunction with electromagnetic devices for mechanically shifting the masks which may be mounted on suitable yokes. The manner in which the vignetting masks in the vignette printer are selectively operated is as follows:

When a camera man photographs a scene, he afterwards indicates on a schedule the lens stop and he also provides all the information with reference to the focus, etc., of the photographed scene. This schedule is sent along with the negative film. The film cutter places on the negative a small copper electrode which is pressed along the sprocket perforation of the film to mark each point of scene change.

When the negative film 22 containing the copper electrodes makes contact with an electrically conductive sprocket wheel 24, electrical impulses are sent to a tape reader mechanism 25. Reader 25 includes a signalling tape having holes punched therein, which holes are sensed by suitable brushes to provide selective signals for operating the masking solenoids or electromagnets. To punch the holes in the tape, a writer is provided having as many positions as there are masking electromagnets. For example, if a given scene requires a mask of a particular type, the punch hole is positioned so as to operate the solenoid for this mask. Thus the reader in response to the electrical impulse from the contacts on the film automatically shifts the masks into position for the proper vignetting.

As shown in Fig. 8, the contact elements 22a are attached to the negative film 22 to mark each point of scene change. For example, if a first scene is taken by the camera under certain conditions of focus, the contact elements 22a attached to the negative indicates the initial film frame of the scene. In the subsequent scene, it may be necessary to effect a change of focus, in which case a second contact element is attached to the negative to mark the beginning of this scene. Thus the successive contact elements on the film do no more than indicate the points of change in the course of film movement.

As pointed out previously, the vignette printer 19 is equipped with a number of different vignette masks, each intended for a photographed scene of a particular type. Contact elements 22a in conjunction with tape reader 25 and the means by which the appropriate masks for a given scene is automatically placed into operative position.

Figure 9:
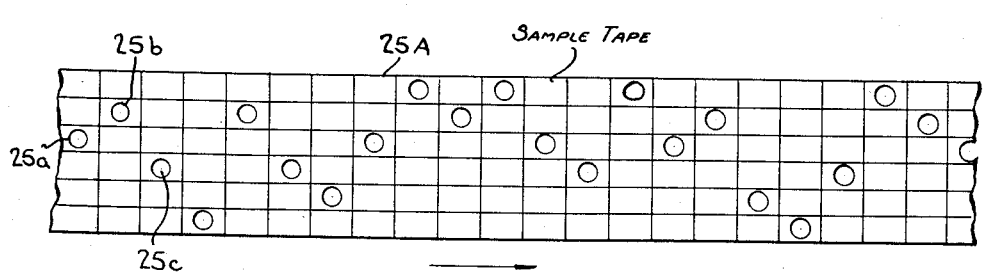
Fig. 9 is a sample of the reader tape.

The reader 25 is provided with a tape 25A, as shown in Fig. 9, having holes 25a, 25b, 25c, etc., therein whose respective positions determine which one of the several mask control solenoids will be actuated. If there are six solenoids, then there are six possible positions.

Thus when an electrical impulse signal is derived from a contact 22a to indicate a change, this impulse is applied to the reader 25 to advance tape 25A relative to a sensing device or brushes. The position of the hole 25a, etc., relative to the brushes will determine which of the solenoids is actuated. As the negative film 22 moves through the continuous printer 21 and a next contact 22a is engaged to indicate a new change, the resultant impulse will advance tape 25A another step to actuate the appropriate solenoid, and so on.

The control mechanism 34 for the several masks need be nothing more than a selector switch 34A to apply current to a selected solenoid, the switching position being determined by the reader tape.

Referring now to Figs. 3 and 4 showing the details of the vignette printer, the raw positive film 17 passes through a suitable film gate in a blower-vented enclosure or housing 26. A partition 27 centered on the film gate divides the enclosure into separate sections A and B. Mounted in section A is a controllable light source 28, such as a stereopticon lamp, whose rays are directed onto a plane mirror 29 through a filter element 30 adapted to pass only pure white rays. The rays reflected by mirror 29 are directed along an optical axis normal to the axis of the rays emanating from the lamp, the reflected rays passing successively through a condensing lens 31 and an objective lens 32 to impinge on the frame margin of the film 17 adjacent the sprocket perforations.

Interposed between the condenser and objective lenses 31 and 32 is a movable vignetting mask 33 which is positioned so as partially to intercept or block the rays projected onto the film and thereby form the desired vignetting band on the film. An identical arrangement is provided in section B of the printer, each component in section A having its counterpart in section B.

As shown in Figs. 5, 6 and 7, three matched pairs of vignetting masks 33a, 33b and 33c are provided, each having a different profile conditioned for a given scene condition. One mask of each pair is included in one section of the printer. When a center film is being printed, both sections of the vignette printer are simultaneously employed, whereas for the side films an appropriate single section of the printer is used to provide a single stripe.

A separate set of electromagnetic solenoids 34 is provided for each set of masks, such that when a given set of solenoids is energized, the related masks are placed into operative position. While three pairs of masks and solenoids have been shown herein, it will be obvious that a greater number may be used, as desired.

Thus in the course of printing the vignetting lines on the positive stock, the masks 33a, 33b and 33c are selectively operated in response to impulses supplied by the contacts on the negative film to the reader mechanism 21. For each scene the appropriate mask is placed automatically into position. When the image of the mask is projected along the inside of the sprocket perforations on the raw film, it may either be in or out of focus depending on the amount of necessary diffusion.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. In a motion picture film printing system wherein vignetting stripes are printed on raw positive film before photographed images taken from a negative are impressed thereon, a vignette printer comprising a light source, lens means to project rays from said source solely onto the margin of a raw positive film, a plurality of vignetting masks having different profiles, a control mechanism selectively to interpose said masks in the path of said rays partially to block same to cast a vignetting band on said film margin, and means responsive to signals derived from said negative which are indicative of scene changes thereon to actuate said control mechanism so as to shift appropriate masks into operative position.

2. In a motion picture film printing system wherein vignetting stripes are printed on raw positive film before photographed images taken from a negative are impressed thereon, a vignette printer comprising a pair of sections each including a light source, lens means to project rays from said source solely onto one margin of a raw positive film, a plurality of vignetting masks having different profiles, a control mechanism selectively to interpose said masks in the path of said rays partially to block same to form a vignetting band on said film margin, whereby when both sections are operative, vignetting bands are produced on both margins of the film simultaneously, and means responsive to signals derived from said negative which are indicative of scene changes thereon to actuate said control mechanism so as to shift appropriate masks into operative position.

3. In a motion picture film printing system wherein vignetting stripes are printed on raw positive film before photographed images taken from a negative are impressed thereon, a vignette printer comprising a film gate for accommodating a raw positive film, a partition centered on said gate to define two sections, each section including a condensing lens, an objective lens, a light source, means to direct rays from said source through said lenses solely onto one margin of said film, a plurality of vignetting masks of different profile interposable between said lenses partially to block said rays to form a vignetting band on said film margin, a control mechanism operatively coupled to said plurality of masks selectively to place said masks into operative position, and means responsive to signals derived from said negative which are indicative of scene changes thereon to actuate said control mechanism so as to shift appropriate masks into operative position.

4. A vignette printer comprising an enclosure having a film gate for accommodating a raw positive film, a partition in said enclosure centered on said gate to divide said enclosure into two sections, a lamp disposed in said section to direct rays along an axis normal to an optical axis extending toward one margin of said film in said gate, a mirror disposed in the path of said light rays to reflect same along said optical axis, a color-correcting filter interposed between said mirror and said lamp to produce white light, a condensing lens and an objective lens disposed along said optical axis to concentrate said reflected light rays solely onto one margin of the film at said gate, a plurality of vignetting masks of different profile interposable between said lenses partially to block said rays thereby to form a vignette band on said film margin, and a control mechanism selectively to place said masks into operative position.

5. A vignette printer for motion picture raw positive film comprising an enclosure having a film gate for accommodating said raw positive film, a partition in said enclosure centered on said gate to divide said enclosure into two sections, a lamp disposed in said section to direct rays along an axis normal to an optical axis extending toward one margin of said film in said gate, a mirror disposed in the path of said light rays to reflect same along said optical axis, a color-correcting filter interposed between said mirror and said lamp to produce white light, a condensing lens and an objective lens disposed along said optical axis to concentrate said reflected light rays solely onto one margin of the film at said gate, a plurality of masks interposed between said lenses partially to block said rays thereby to form a vignette band on said film margin, said masks having different profiles, and a control mechanism including solenoids mechanically coupled to said masks selectively to place same in operative position.

6. A dual printing system for photographically impressing vignetting stripes as well as photographed images from a negative within a frame area on a raw positive film, said system comprising a vignette printer adapted to impress at least one vignette band onto the frame margin of said positive film and including a plurality of different masks and a control mechanism selectively to actuate the masks to place them into operative position, a continuous printer, means to pass said raw positive film containing said vignette stripes and a developed negative film simultaneously into said continuous printer thereby to impress picture images onto said positive film, contact elements secured to said negative film at spaced points thereon to mark changes of scene, means engaging said contacts to provide signal impulses, and means responsive to said signal impulses and operatively coupled to said control mechanism to cause said mechanism to shift appropriate masks into operative position in said vignette printer.

7. A dual printing system for photographically impressing vignetting stripes as well as photographed images from a negative within a frame area on a raw positive film, said system comprising a vignette printer adapted to impress at least one vignette band onto the frame margin of said positive film and including a plurality of masks of different profile and a control mechanism selectively to actuate the masks to place them into operative position, a continuous printer, means to pass said raw positive film containing said vignette stripes and a developed negative film simultaneously into said continuous printer thereby to impress picture images onto said positive film, contact element secured to said negative film at spaced points thereon to mark changes of scene, sprocket means engaging said contacts to provide signal impulses, and a tape reader responsive to said signal impulses and operatively coupled to said control mechanism to cause mechanism to shift appropriate masks into operative position in said vignette printer.

8. In a motion picture film printing system wherein vignetting stripes are printed on raw positive film before photographed images taken from a negative are impressed thereon, the combination of a vignette printer including means to project light rays onto the margin of the raw positive film, a plurality of vignetting masks having different profiles and a control mechanism to interpose said masks selectively in the path of said rays so as to cast vignetting stripes on said film margin; and apparatus operatively coupled to said control mechanism including a signal source to produce impulses in accordance with scenic changes on the negative and means to apply said impulses to said control mechanism to cause said mechanism to shift the appropriate mask into operative position.

9. The combination, as set forth in claim 8, wherein said signal source is constituted by contact elements secured to said negative at spaced points thereon to mark changes in scene, and electrical contact means engaging said contact elements to produce said signal impulses.

References Cited in the file of this patent

UNITED STATES PATENTS

| | | |
|---|---|---|
| 1,742,811 | Hopkins | Jan. 7, 1930 |
| 1,803,404 | Owens | May 5, 1931 |
| 1,963,510 | Troland | June 19, 1934 |
| 2,047,474 | Howell | July 14, 1936 |
| 2,243,047 | Foster | May 20, 1941 |
| 2,271,572 | Rackett | Feb. 3, 1942 |
| 2,331,451 | Blaney | Oct. 12, 1943 |

FOREIGN PATENTS

| | | |
|---|---|---|
| 186,993 | Great Britain | Oct. 9, 1922 |
| 2703/31 | Australia | June 22, 1931 |

UNITED STATES PATENT OFFICE
CERTIFICATE OF CORRECTION

Patent No. 2,955,520            October 11, 1960

Russell H. McCullough

It is hereby certified that error appears in the printed specification of the above numbered patent requiring correction and that the said Letters Patent should read as corrected below.

Column 6, line 62, claim 7, before "mechanism", second occurrence, insert -- said --.

Signed and sealed this 11th day of April 1961.

(SEAL)
Attest:
ERNEST W. SWIDER

Attesting Officer

ARTHUR W. CROCKER
Acting Commissioner of Patents